United States Patent
Dudding et al.

(10) Patent No.: US 10,959,426 B1
(45) Date of Patent: Mar. 30, 2021

(54) PATHOGEN ELIMINATING ARTICLE AND METHODS OF MANUFACTURING AND USING THE SAME

(71) Applicant: CLAW Biotech Holdings LLC, Des Peres, MO (US)

(72) Inventors: Jeffery L. Dudding, Center, MO (US); Amod P. Paranjpe, Augusta, MO (US)

(73) Assignee: CLAW BIOTECH HOLDINGS LLC, Des Peres, MO (US)

( * ) Notice: Subject to any disclaimer, the term of this patent is extended or adjusted under 35 U.S.C. 154(b) by 0 days.

(21) Appl. No.: 15/824,367

(22) Filed: Nov. 28, 2017

Related U.S. Application Data

(60) Provisional application No. 62/426,760, filed on Nov. 28, 2016.

(51) Int. Cl.
*A01N 25/34* (2006.01)
*B65D 81/28* (2006.01)
*A01N 59/16* (2006.01)
*A01N 59/20* (2006.01)

(52) U.S. Cl.
CPC ............. *A01N 25/34* (2013.01); *A01N 59/16* (2013.01); *A01N 59/20* (2013.01); *B65D 81/28* (2013.01)

(58) Field of Classification Search
CPC ........ A01N 25/34; A01N 59/16; A01N 59/20; B65D 81/28
See application file for complete search history.

(56) References Cited

U.S. PATENT DOCUMENTS

| | | | |
|---|---|---|---|
| 3,298,803 A * | 1/1967 | Ulam | B32B 15/015 428/677 |
| 3,966,426 A | 6/1976 | McCoy et al. | |
| 4,646,935 A * | 3/1987 | Ulam | A47J 36/02 219/621 |
| 6,267,830 B1 | 7/2001 | Groll | |
| 6,929,705 B2 | 8/2005 | Myers et al. | |
| 7,488,444 B2 | 2/2009 | Furst et al. | |
| 7,906,221 B2 | 3/2011 | Groll | |
| 8,133,596 B2 | 3/2012 | Groll | |
| 8,609,036 B2 | 12/2013 | Fuller et al. | |
| 8,723,308 B2 * | 5/2014 | Yang | B81B 7/0064 257/698 |
| 8,778,408 B2 | 7/2014 | Hirota et al. | |
| 9,162,013 B2 | 10/2015 | Guggenbichler et al. | |
| 9,675,079 B1 | 6/2017 | Dudding et al. | |
| 2006/0283865 A1 * | 12/2006 | Cheng | A47J 36/02 220/573.1 |
| 2009/0178410 A1 * | 7/2009 | Straza | B29D 99/0089 60/725 |
| 2010/0061884 A1 | 3/2010 | Clark et al. | |
| 2012/0225312 A1 | 9/2012 | Chin et al. | |
| 2014/0224519 A1 | 8/2014 | Mallak et al. | |
| 2015/0086497 A1 | 3/2015 | Niki et al. | |
| 2015/0290042 A1 | 10/2015 | Freer et al. | |
| 2016/0186295 A1 * | 6/2016 | Oishi | C22C 9/04 148/554 |

FOREIGN PATENT DOCUMENTS

| | | | |
|---|---|---|---|
| CN | 201055998 Y | | 5/2008 |
| CN | 103911540 A | | 7/2014 |
| KR | 20010088990 | * | 9/2001 |
| WO | 2012045308 A1 | | 4/2012 |

OTHER PUBLICATIONS

Zhu et al., Food Microbiology, 30(1), 2012, 303-310.*
NickelAlloys.net (Copper Alloys—Copper/Nickel Alloys; published: Nov. 25, 2015).*
Hobman et al., "Bacterial antimicrobial metal ion resistance", Journal of Medical Microbiology, dated Nov. 2014, pp. 471-497.
Romanszki et al., "Polystyrene films as barrier layers for corrosion protection of copper and copper alloys", Bioelectrochemistry, dated 2014, pp. 7-14.
"Research reveals 'halo' effect of copper surfaces", http://ww.cleanroomlechnology.com, date retrieved Jun. 24, 2015, pp. 2.

* cited by examiner

Primary Examiner — Genevieve S Alley
(74) Attorney, Agent, or Firm — Armstrong Teasdale LLP

(57) ABSTRACT

An antimicrobial article including a first layer of a shielding material having a first surface and an opposite second surface. The article also includes a core material coupled to the first surface. The core material includes an antimicrobial material configured to eliminate pathogens on the second surface without contacting the pathogens.

19 Claims, 9 Drawing Sheets

PATHOGEN ELIMINATING ARTICLE AND METHODS OF MANUFACTURING AND USING THE SAME

CROSS REFERENCE TO RELATED APPLICATION

This application is a non-provisional application and claims priority to U.S. Provisional Patent Application Ser. No. 62/426,760 filed Nov. 28, 2016, for "PATHOGEN ELIMINATING ARTICLE AND METHODS OF MANUFACTURING AND USING THE SAME", which is hereby incorporated by reference in its entirety.

BACKGROUND

The present disclosure is directed generally to methods and apparatus related to antimicrobial products for use in neutralizing harmful pathogens and, more particularly, to methods and apparatus that include an antimicrobial alloy core encased in a protective shielding that neutralizes the pathogens without physical contact.

Currently, there exists a large variety of strains of antibiotic resistant virulent microbes. Such microbes are known to cause a variety of diseases. Microbes like methicillin-resistant *Staphylococcus aureus* strain ATCC 6538, which, if left untreated, can lead to sickness and even death. This problem is especially prevalent in locations (hospitals, hotels, public schools, elderly homes, etc.) where infectious microbes can easily be spread among its inhabitants. There is a need to frequently disinfect surfaces that people may come into contact with. Additionally, microbes such as *E. Coli* and *Salmonella* are known to be found in food manufacturing and preparation facilities where the possibility exists for the microbes to be located on surfaces that contact food items before they are packaged or prepared for human consumption. Such locations and facilities require frequent cleaning using antimicrobial agents to disinfect surfaces that may harbor infectious microbes.

At least some known antimicrobial agents include chemical antimicrobial agents, e.g., disinfectants. However, at least some chemical antimicrobial agents may be harmful to both the environment and the person coming into contact with them. Also, at least some chemical antimicrobial agents lose their antimicrobial effectiveness within a relatively short time period as the microbes become resistant to the agent.

Another known antimicrobial agent includes an antimicrobial metallic alloy used to disinfect a surface having harmful microbes. Such alloys use a natural oligodynamic effect to reduce or eliminate the microbes that directly contact the surface of the alloy. However, at least some known antimicrobial metallic alloys are formed from materials that oxidize relatively easily, especially when exposed to external elements such as the open air or chemical antimicrobial agents that may be used to further eliminate the microbes. Additionally, the materials that make up many known antimicrobial metallic alloys are relatively soft and may be susceptible to marring, fragmentation, and other damage during use. Such qualities are undesirable, especially in food preparation products because of the risk of contamination, which may lead to illness.

DETAILED DESCRIPTION

Figure 1:
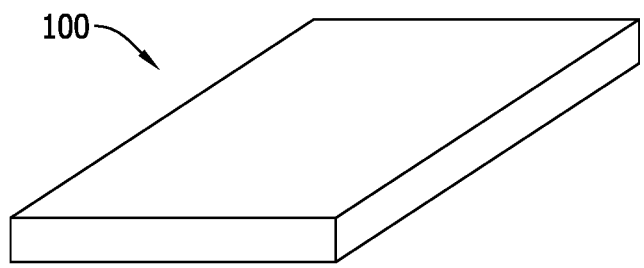
FIG. 1 is a perspective view of an exemplary antimicrobial article.

Described herein is an antimicrobial article including an antimicrobial metallic alloy core and a non-antimicrobial shield coupled to the antimicrobial core. The antimicrobial core includes an antimicrobial alloy containing a minimum of 2% of at least one of copper/copper alloys/copper oxides, silver/silver alloys/silver oxides, gold/gold alloys/gold oxides, or molybdenum/molybdenum alloys/molybdenum oxides. The antimicrobial article may include any antimicrobial alloy, such as, for example, antimicrobial copper/copper alloys, identified by the United States Environmental Protection Agency (EPA). The non-antimicrobial shield is fabricated from a non-antimicrobial material, such as, but not limited to stainless steel and serves as a protective layer to the antimicrobial core providing strength, physical and chemical durability, and stainless qualities. As described herein, the antimicrobial article provides an antimicrobial property due to a "spectrum of efficacy" produced by the protected antimicrobial alloy core that kills potentially harmful pathogens located within a certain range of the antimicrobial alloy core. As such, the "spectrum of efficacy" of the antimicrobial article enables the antimicrobial alloy core to disinfect the surface of the shield opposite the antimicrobial core without contacting the bacterium located thereon and within a relatively short period of time.

Additionally, as used herein, the term "pathogens" is meant to describe any harmful virus, bacteria, or fungus that may cause disease. For example, a pathogen may be any of methicillin-resistant *Staphylococcus aureus* strain ATCC 6538, and the like. More specifically, pathogens commonly found in healthcare environments include *Acinetobacter baumannii, Bacteroides fragilis, Burkholderia cepacia, Clostridium difficile, Clostridium sordellii*, Carbapenem-resistant Enterobacteriaceae, *Enterococcus faecalis, Escherichia coli*, Hepatitis A, Hepatitis B, Hepatitis C, Human Immunodeficiency Virus, Influenza, *Klebsiella pneumonia*, Methicillin-resistant *Staphylococcus aureus, Morganella morganii, Mycobacterium abscessus*, Norovirus, Psuedomonas *aeruginosa, Staphylococcus aureus, Stenotrophomonas maltophilia, Mycobacterium tuberculo-*

*sis*, Vancomyin-resistant *Staphylococcus aureus*, and Vancomycin-resistant Enterococci.

Furthermore, pathogens commonly found in food production that are eliminated by the "spectrum of efficacy" include *Bacillus cereus*, Botulism, *Campylobacter, Clostridium perfringens, Listeria, Salmonella, Shigella, Vibrio vulnificus* and *Vibrio parahaemolyticus*. Many known pathogens eliminated by the "spectrum of efficacy" may be found in many different environments.

The terms "including", "comprising" and variations thereof, as used in this disclosure, mean "including, but not limited to", unless expressly specified otherwise.

The terms "a", "an", and "the", as used in this dis-closure, means "one or more", unless expressly specified otherwise. The terms "about" or "approximately" refer to within +/−10%, when referring to a percentage.

Although process steps, method steps, or the like, may be described in a sequential order, such processes and methods may be configured to work in alternate orders. In other words, any sequence or order of steps that may be described does not necessarily indicate a requirement that the steps be performed in that order. The steps of the processes or methods described herein may be performed in any order that facilitates operation of the method.

Referring now to FIG. 1, a perspective view of an exemplary antimicrobial article 100 is illustrated. Antimicrobial article 100 includes any product used in, for example, healthcare, extended care, residential or commercial facilities, public or private facilities, public or private vehicles, food manufacturing and preparation locations, medical and other health care devices, refrigeration units, HVAC (heating, ventilation and air conditioning) equipment, agriculture (to prevent greening disease and other similar plant pathogens), or anywhere else where pathogens may be transferred through contact of or exposure to a surface.

Figure 2:
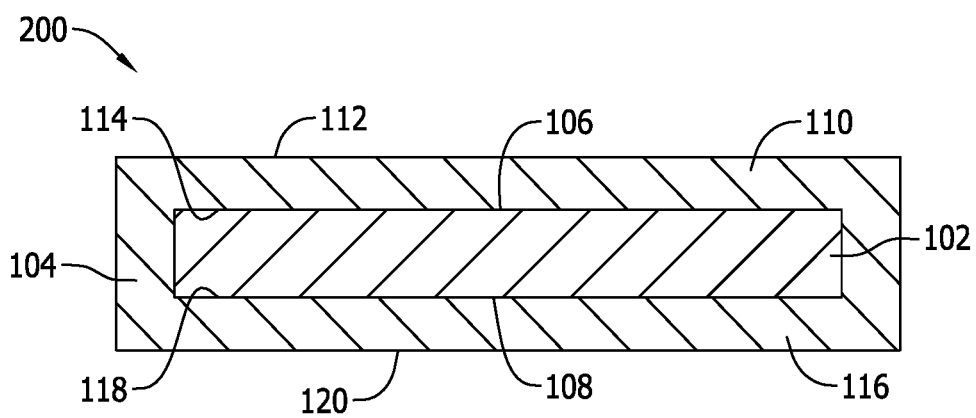
FIG. 2 is a cross-sectional view of the antimicrobial article shown in FIG. 1.

FIG. 2 is a cross-sectional view of another antimicrobial article 100 illustrating an antimicrobial core 102 encased within non-antimicrobial shield 104 to prevent exposure of antimicrobial core 102, as described in further detail below.

In the exemplary embodiment, antimicrobial article 100 includes antimicrobial core 102 coupled to a surface of non-antimicrobial shield 104 such that antimicrobial core 102 kills any pathogens located on a surface of non-antimicrobial shield 104 opposite antimicrobial core 102 without directly contacting the pathogens. More specifically antimicrobial core 102 includes a first surface 106 and a second surface 108, and non-antimicrobial shield 104 includes a first layer 110 having a third surface 112 and a fourth surface 114 and a second layer 116 having a fifth surface 118 and a sixth surface 120.

Antimicrobial core 102 is coupled to first layer 110 of non-antimicrobial shield 104 such that first surface 106 is coupled in a face-to-face relationship with fourth surface 114. In such a configuration, the spectrum of efficacy antimicrobial property of antimicrobial core 102 penetrates non-antimicrobial shield 104 and disinfects third surface 112 without directly contacting the pathogen located on third surface 112 within a time period of approximately 2-3 hours. In the exemplary embodiment, antimicrobial core 102 effectively kills pathogens within approximately 2-3 hours of the pathogens being located proximate antimicrobial core 102. Article 100 may be located in any location that is likely to come within an estimated effective range of a "spectrum of efficacy" of antimicrobial core 102. In the exemplary embodiment, experimentation has demonstrated that the "spectrum of efficacy" of antimicrobial core 102 exhibits up to 70% effectiveness against pathogen microbes at a distance of up to 25.0 centimeters (9.84 inches). Furthermore, the effectiveness against pathogen microbes has been shown to be independent of both shielding material and thickness.

In the exemplary embodiment, article 100 includes second layer 116 coupled to antimicrobial core 102 such that second surface 108 is coupled in a face-to-face relationship with fifth surface 114. In such a configuration, the "spectrum of efficacy" disinfects both third and sixth surfaces 112 and 120 within the same time period. As such, in the exemplary embodiment, article 100 includes only three layers of material, with antimicrobial core 102 positioned between layers of non-antimicrobial shield 104, and no additional layers of material are provided in article 100 such that non-antimicrobial shield 104 completely encases antimicrobial core 102. As such, antimicrobial core 102 is prevented from any exposure to the atmosphere or external elements. More specifically, antimicrobial core 102 is coupled in a face-to-face relationship with non-antimicrobial shield 104 such that no air gap exists between surfaces 106 and 114 or between surfaces 108 and 118. Generally, non-antimicrobial shield 104 serves as a protective layer between antimicrobial core 102 and the external environment. In the exemplary embodiment, antimicrobial core 102 and non-antimicrobial shield 104 are coupled via any known welding process. Alternatively, antimicrobial core 102 and non-antimicrobial shield 104 are coupled via any manner, such as adhesive bonding.

In the exemplary embodiment, non-antimicrobial shield 104 is fabricated from a metal or metallic alloy of stainless steel, titanium, nickel, aluminum, sheet metal, tin, or any combination thereof. Preferably, non-antimicrobial shield 104 is fabricated from a commercially available stainless steel alloy such as, but not limited to one of 304, 304L, 316, and 316L alloys. Alternatively, non-antimicrobial shield 104 is fabricated from at least one of a hard plastic material, an elastomeric material, and a ceramic material. Generally, non-antimicrobial shield 104 is fabricated from any material that facilitates protecting antimicrobial core 102 from external environmental effects such as impacts, chopping, cutting, chemical wipes, and the like. As such, non-antimicrobial shield 104 prevents any outside substance from contacting antimicrobial core 102. In the exemplary embodiment, non-antimicrobial shield 104 is more than 10% of a total material by weight and/or by volume of antimicrobial article 100. More specifically, non-antimicrobial shield 104 makes up between approximately 10% by weight and/or by volume to approximately 99% by weight and/or by volume of a total material of antimicrobial article 100. Even more specifically, non-antimicrobial shield 104 makes up between approximately 10% by weight and/or by volume to approximately 50% of a total material by weight and/or by volume of antimicrobial article 100. Alternatively, non-antimicrobial shield 104 consists of any percentage of material for article 100.

In the exemplary embodiment, antimicrobial core 102 is fabricated from an antimicrobial alloy including at least one transition metal. As used herein, "transition metal" is used to describe an element whose atom has a partially filled d sub-shell, or which can give rise to cations with an incomplete d sub-shell. More specifically, "transition metal" is used to describe any element in the d-block of the periodic table, which includes groups 3 to 12 on the periodic table. Particularly, antimicrobial core 102 is fabricated from an antimicrobial alloy including any combination of copper, copper alloys, copper oxides, silver, silver alloys, silver oxides, gold, gold alloys, gold oxides, and molybdenum, molybdenum alloys, molybdenum oxides.

More specifically, antimicrobial core 102 includes an antimicrobial active component and a non-antimicrobial inactive component. The active component includes at least one of the above described antimicrobial materials. Specifically, the active component includes any combination of copper, copper alloys, copper oxides, silver, silver alloys, silver oxides, gold, gold alloys, gold oxides, and molybdenum, molybdenum alloys, molybdenum oxides. Additionally, the active component makes up at least 10% by weight and/or by volume of a total material of antimicrobial core 102. More specifically, the active component makes up at least 2% by weight and/or by volume of a total material of antimicrobial core 102.

In the exemplary embodiment, the inactive component includes at least one of nickel, titanium, and zinc. Alternatively, the inactive component includes any non-antimicrobial metal. The inactive component makes up between approximately 1% by weight and/or by volume to approximately 98% by weight and/or by volume of a total material of antimicrobial core 102.

Overall, in the exemplary embodiment, antimicrobial core 102 makes up between approximately 10% by weight and/or by volume to approximately 90% by weight and/or by volume of a total material of antimicrobial article 100. For example, in the exemplary embodiment, antimicrobial core 102 includes an alloy of approximately 70% by weight and/or by volume of the active component, such as copper, and approximately 30% by weight and/or by volume of the inactive component, such as nickel.

Figure 3:
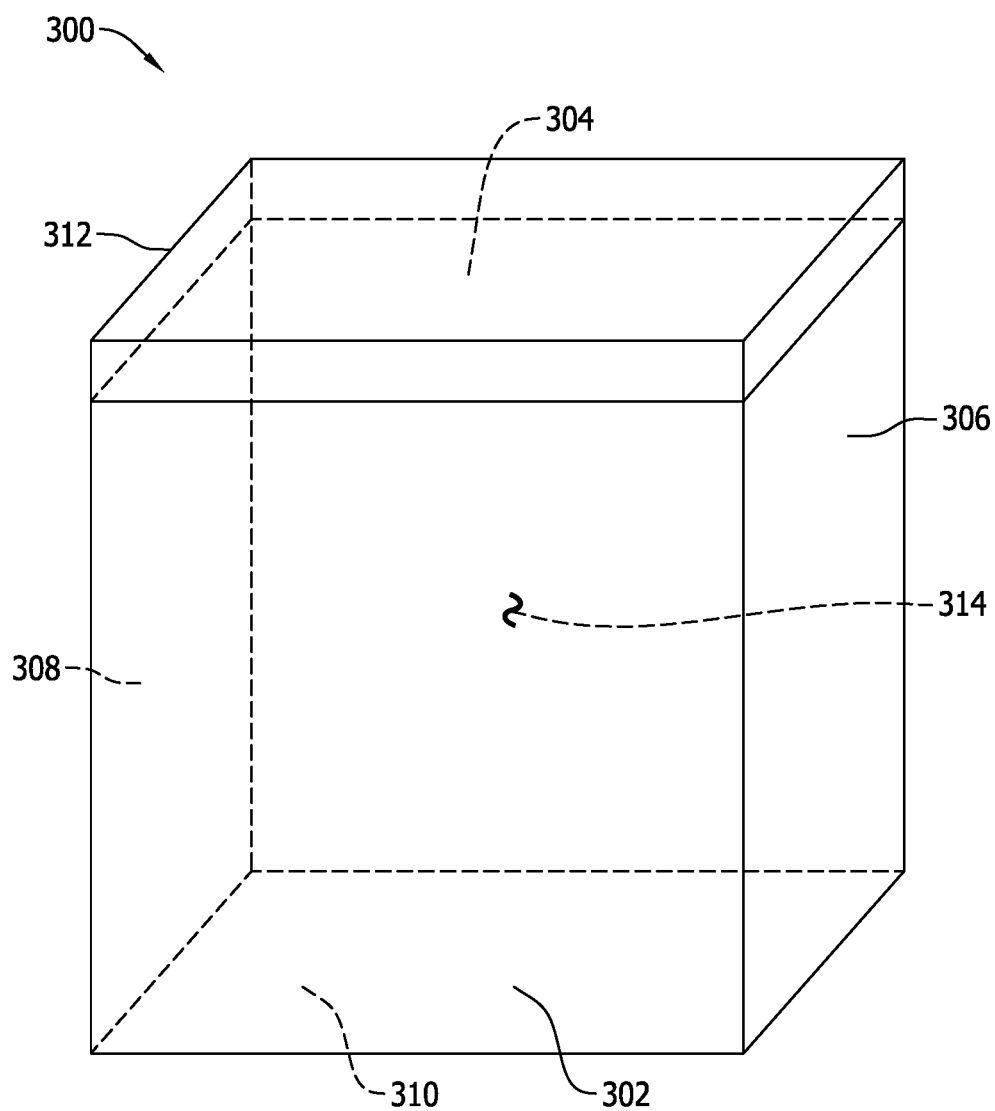
FIG. 3 is a perspective view of a food storage container at least partially formed from the antimicrobial article shown in FIG. 1.

FIG. 3 is a perspective view of a food storage container 300 at least partially formed from antimicrobial article 100 (shown in FIG. 1). In the exemplary embodiment, container 300 includes a front wall 302, a rear wall 304, a first sidewall 306, a second sidewall 308, a bottom wall 310, and a cover 312. Walls 302-312 together define a cavity 314 within container 300 in which food is meant to be stored. In the exemplary embodiment, container 300 includes removable cover 312. Alternatively, container 300 is a five-sided container not having a cover. Generally, container 300 is any structure in which food may be placed for storage and preservation.

In the exemplary embodiment, each of walls 302-312 is formed from antimicrobial article 100 such that any food placed within cavity 314 is surrounded by antimicrobial article 100. Alternatively, fewer than all of walls 302-312 are formed from antimicrobial article 100. For example, in one embodiment, only bottom wall 310 is formed from antimicrobial article 100. In such a configuration, any other walls of container 300 are formed from any material. Generally, at least one of walls 302-312 is formed from antimicrobial article.

In operation, food meant for consumption, or any other perishable item, is placed within container 300 having at least one of walls 302-312 formed from antimicrobial article 100. The "spectrum of efficacy" of antimicrobial article 100, as described above, effectively neutralizes a majority of the pathogens that cause the food items to begin to decay. As such, food items stored in container 300 decay at a much slower rate than when not exposed to the "spectrum of efficacy" of antimicrobial article 100, and food items with a relatively short shelf life, such as fruits, may be stored in container 300 in an edible state for a much longer period of time before consumption.

Figure 4:
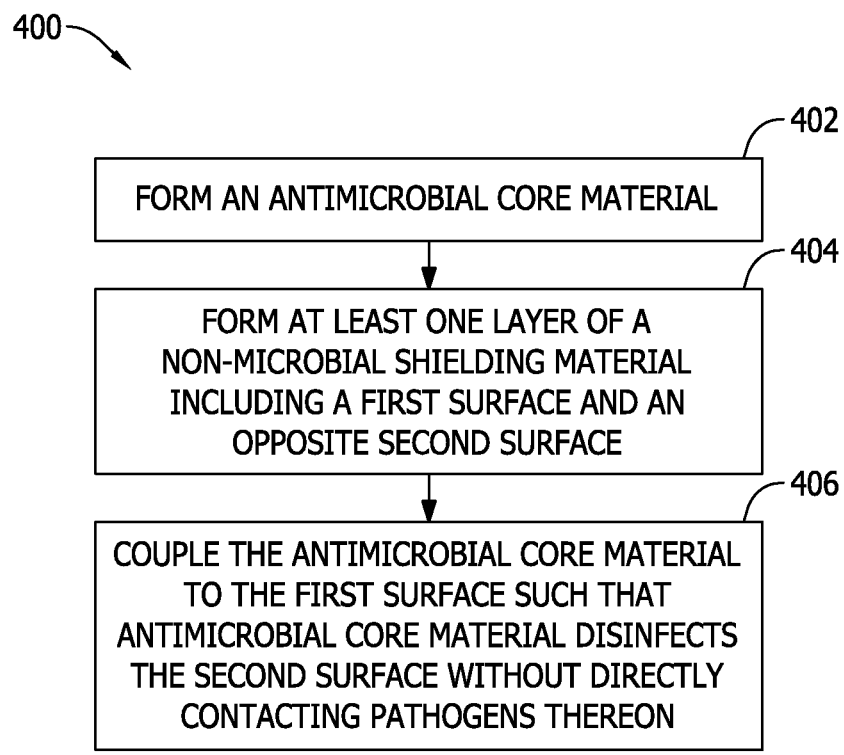
FIG. 4 is a flow diagram of a method of disinfecting a surface using the antimicrobial article.

FIG. 4 is a flow diagram of a method 400 of disinfecting a surface using an antimicrobial article, such as antimicrobial article 100 (shown in FIGS. 1 and 2). Method 400 includes forming 402 an antimicrobial core material, such as antimicrobial core 102 (shown in FIG. 2), and forming 404 at least one layer of a non-antimicrobial shielding material, such as non-antimicrobial shield 104 (shown in FIG. 2), including a first surface and an opposite second surface, such as surfaces 112 and 114 (shown in FIG. 2). Method 400 also includes coupling 406 the antimicrobial core to the first surface such that the antimicrobial core disinfects the second surface without contacting pathogens thereon.

Figure 5:
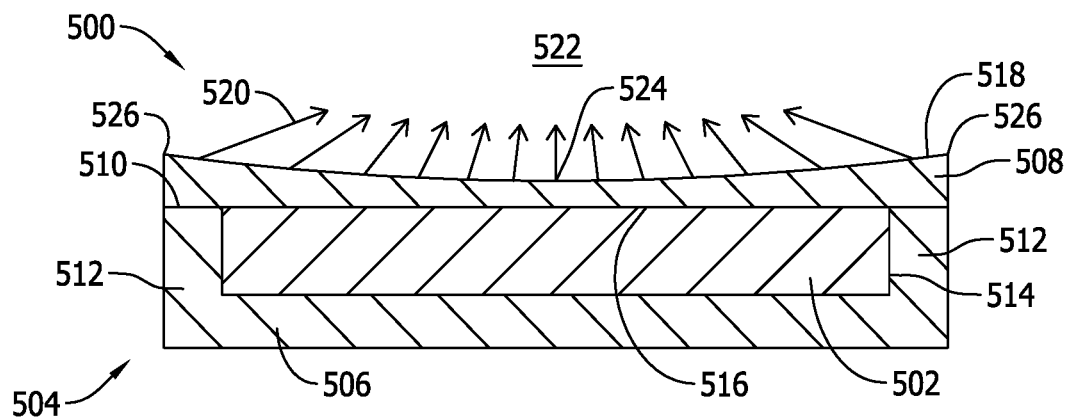
FIG. 5 is a cross-sectional view of another antimicrobial article.

FIG. 5 is a cross-sectional view of another antimicrobial article 500 illustrating an antimicrobial core 502 encased within non-antimicrobial shield 504 to prevent exposure of antimicrobial core 502 to the atmosphere or external elements. Similar to article 100, antimicrobial article 500 includes antimicrobial core 502 coupled to a surface of non-antimicrobial shield 504 such that antimicrobial core 502 kills any pathogens located on a surface of non-antimicrobial shield 504 opposite antimicrobial core 502 without directly contacting the pathogens.

In the embodiment shown in FIG. 5, core 502 is substantially similar to core 102 (shown in FIG. 2) such that antimicrobial core 502 is also fabricated from an antimicrobial alloy including any combination of copper, copper alloys, copper oxides, silver, silver alloys, silver oxides, gold, gold alloys, gold oxides, and molybdenum, molybdenum alloys, molybdenum oxides. More specifically, antimicrobial core 502 includes an antimicrobial active component and a non-antimicrobial inactive component. As described herein, the active component includes at least one of copper, copper alloys, copper oxides, silver, silver alloys, silver oxides, gold, gold alloys, gold oxides, and molybdenum, molybdenum alloys, molybdenum oxides. Similarly, shield 504 is substantially similar to shield 104 (shown in FIG. 2) such that non-antimicrobial shield 504 is fabricated from a metal or metallic alloy of stainless steel, titanium, nickel, aluminum, sheet metal, tin, or any combination thereof. Preferably, non-antimicrobial shield 504 is fabricated from a commercially available stainless steel alloy such as, but not limited to one of 304, 304L, 316, and 316L alloys. Alternatively, non-antimicrobial shield 504 is fabricated from at least one of a hard plastic material, an elastomeric material, and a ceramic material. Generally, non-antimicrobial shield 504 is fabricated from any material that facilitates protecting antimicrobial core 502 from external environmental effects such as impacts, chopping, cutting, chemical wipes, and the like.

Figure 6:
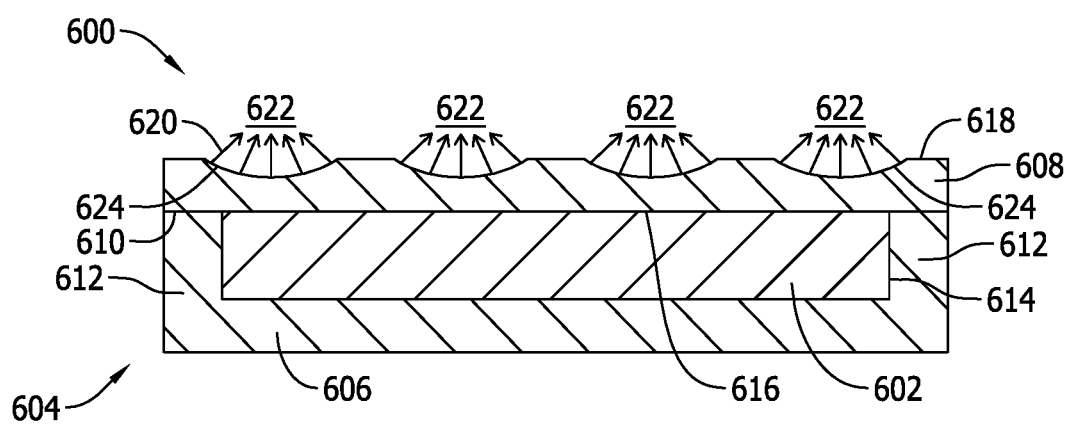
FIG. 6 is a cross-sectional view of yet another antimicrobial article.

Antimicrobial shield 504 includes a first portion 506, a second portion 508, and a seam 510 where first portion 506 is coupled to second portion 508. As shown in FIG. 6, second portion 508 includes a plurality of sidewalls 512 that form a cavity 514 configured to receive antimicrobial core 502 therein. In the embodiment, sidewalls 512 are substantially flush with a top surface 516 of core 502. Alternatively, sidewalls 512 terminate short of top surface 516 and second portion 508 of shield 504 includes sidewalls (not shown) that engage sidewalls 512 to form antimicrobial article 500.

Second portion 508 of non-antimicrobial shield 504 includes a top surface 518 that focuses an antimicrobial effect 520 from core 502 into a predetermined location or area 522. More specifically, top surface 518 of shield second portion 508 includes a single continuous curve such that antimicrobial effect 520 is focused on area 522. Even more specifically, top surface 518 includes a center point 524 that is positioned lower that a plurality of raised edges 526 of second portion 508 such that top surface 518 is parabolic to focus antimicrobial effect 520 on area 522. Such a configuration enables a user to concentrate the antimicrobial effects of article 500 onto area 522 for more thorough or faster disinfecting.

Figure 7:
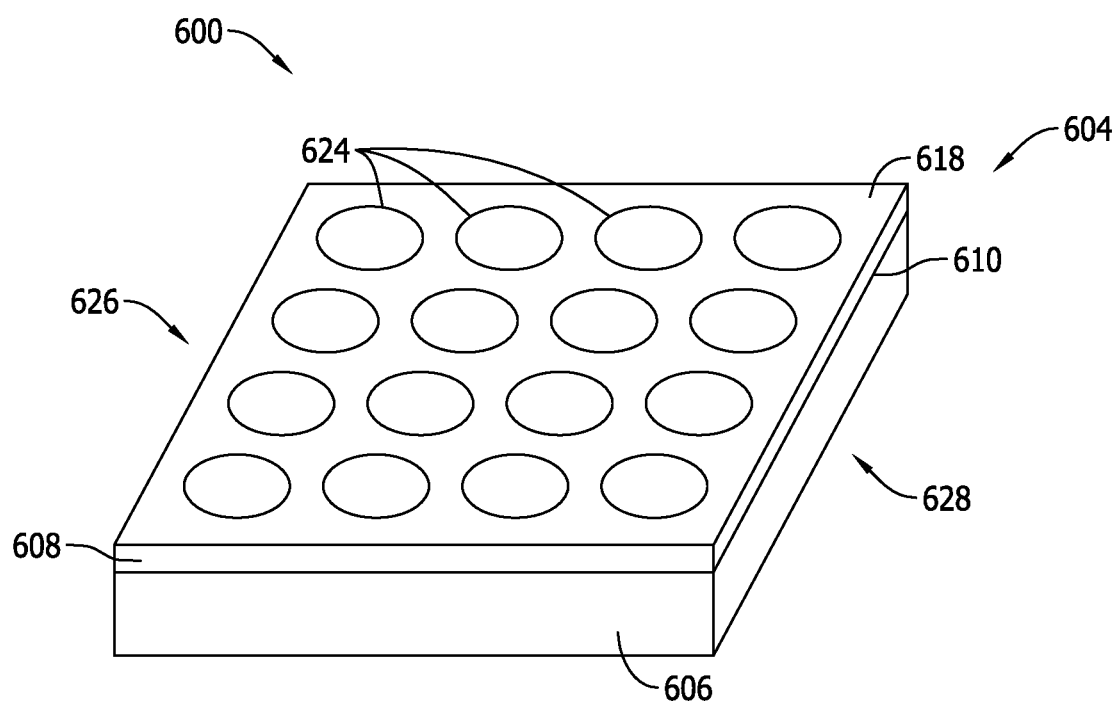
FIG. 7 is a perspective view of the antimicrobial article shown in FIG. 7.

FIG. 6 is a cross-sectional view of yet another antimicrobial article 600 illustrating an antimicrobial core 602 encased within non-antimicrobial shield 604 to prevent exposure of antimicrobial core 602 to the atmosphere or external elements. FIG. 7 is a perspective view of antimicrobial article 600 shown in FIG. 6. Similar to articles 100 and 500, antimicrobial article 600 includes antimicrobial core 602 coupled to a surface of non-antimicrobial shield 604 such that antimicrobial core 602 kills any pathogens located on a surface of non-antimicrobial shield 604 opposite antimicrobial core 602 without directly contacting the pathogens.

In the embodiment shown in FIG. 6, core 602 is substantially similar to core 102 (shown in FIG. 2) such that antimicrobial core 602 is also fabricated from an antimicrobial alloy including any combination of copper, copper alloys, copper oxides, silver, silver alloys, silver oxides, gold, gold alloys, gold oxides, and molybdenum, molybdenum alloys, molybdenum oxides. More specifically, antimicrobial core 602 includes an antimicrobial active component and a non-antimicrobial inactive component. As described herein, the active component includes at least one of copper, gold, silver, and molybdenum. Similarly, shield 604 is substantially similar to shield 104 (shown in FIG. 2) such that non-antimicrobial shield 604 is fabricated from a metal or metallic alloy of stainless steel, titanium, nickel, aluminum, sheet metal, tin, or any combination thereof. Preferably, non-antimicrobial shield 604 is fabricated from a commercially available stainless steel alloy such as, but not limited to one of 304, 304L, 316, and 316L alloys. Alternatively, non-antimicrobial shield 604 is fabricated from at least one of a hard plastic material, an elastomeric material, and a ceramic material. Generally, non-antimicrobial shield 604 is fabricated from any material that facilitates protecting antimicrobial core 602 from external environmental effects such as impacts, chopping, cutting, chemical wipes, and the like.

Antimicrobial shield 604 includes a first portion 606, a second portion 608, and a seam 610 where first portion 606 is coupled to second portion 608. As shown in FIG. 6, second portion 608 includes a plurality of sidewalls 612 that form a cavity 614 configured to receive antimicrobial core 602 therein. In the embodiment, sidewalls 612 are substantially flush with a top surface 616 of core 602. Alternatively, sidewalls 612 terminate short of top surface 616 and second portion 608 of shield 604 includes sidewalls (not shown) that engage sidewalls 612 to form antimicrobial article 600.

Second portion 608 of non-antimicrobial shield 504 includes a top surface 618 that focuses antimicrobial effect 620 from core 602 into a plurality of predetermined locations or areas 622. More specifically, top surface 618 of shield second portion 608 includes a plurality of dimples or depressions 624 that focus antimicrobial effect 620 from core 602 into predetermined locations or areas 622. Such a configuration enables a user to concentrate the antimicrobial effects of article 600 onto areas 522 for more thorough or faster disinfecting.

Figure 8:
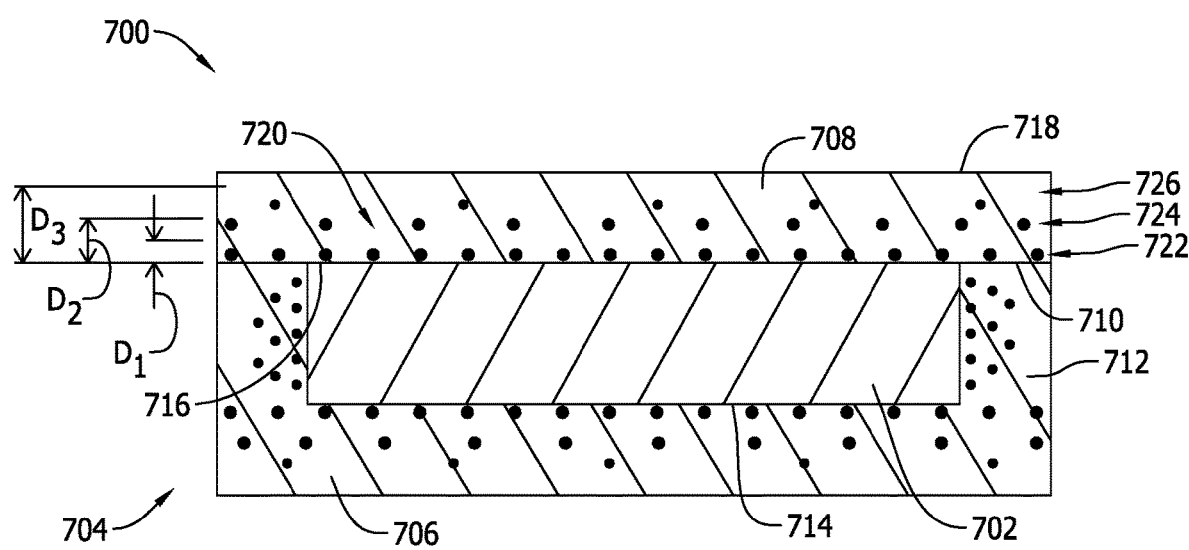
FIG. 8 is a cross-sectional view of any of the antimicrobial articles shown in FIGS. 2, 5, and 6.

In the embodiment shown in FIGS. 7 and 8, each depression 624 is similarly sized and is arranged in a plurality of rows that extend from a first side 626 of article 600 to an opposing second side 628. In another embodiment, depressions 624 extend only a partial distance between sides 626 and 628. Furthermore, in another embodiment, depressions 624 are different sizes such that antimicrobial effect 620 is focused at different heights above top surface 618. Additionally, in one embodiment, depressions 624 are arranged a circular or a plurality of circles. Generally, any number of depressions 624 are arranged in any pattern to facilitate concentrating antimicrobial effect 620 from core 602 into any number of predetermined areas 622.

FIG. 8 is a cross-sectional view of any of the antimicrobial articles 100, 500, and 600 shown in FIGS. 2, 5, and 6. For simplicity, the antimicrobial article in FIG. 9 will be described similarly as articles 500 and 600 and be referred to using reference numerals in the 700 series. As such, antimicrobial article 700 includes an antimicrobial core 702 encased within non-antimicrobial shield 704 to prevent exposure of antimicrobial core 702 to the atmosphere or external elements. Similar to articles 100, 500, and 600, antimicrobial article 700 includes antimicrobial core 702 coupled to non-antimicrobial shield 704 such that antimicrobial core 602 kills any pathogens located on a surface of non-antimicrobial shield 704 opposite antimicrobial core 702 without directly contacting the pathogens.

In the embodiment shown in FIG. 8, core 702 is substantially similar to cores 102, 502, and 602 such that antimicrobial core 702 is also fabricated from an antimicrobial alloy including any combination of copper, copper alloys, copper oxides, silver, silver alloys, silver oxides, gold, gold alloys, gold oxides, and molybdenum, molybdenum alloys, molybdenum oxides. More specifically, antimicrobial core 702 includes an antimicrobial active component and a non-antimicrobial inactive component. As described herein, the active component includes at least one of copper, copper alloys, copper oxides, silver, silver alloys, silver oxides, gold, gold alloys, gold oxides, and molybdenum, molybdenum alloys, molybdenum oxides. Similarly, shield 704 is substantially similar to shield 104, 504, and 604 such that non-antimicrobial shield 704 is fabricated from a metal or metallic alloy of stainless steel, titanium, nickel, aluminum, sheet metal, tin, or any combination thereof. Preferably, non-antimicrobial shield 704 is fabricated from a commercially available stainless steel alloy such as, but not limited to one of 304, 304L, 316, and 316L alloys. Alternatively, non-antimicrobial shield 704 is fabricated from at least one of a hard plastic material, an elastomeric material, and a ceramic material. Generally, non-antimicrobial shield 704 is fabricated from any material that facilitates protecting antimicrobial core 702 from external environmental effects such as impacts, chopping, cutting, chemical wipes, and the like.

In one embodiment, antimicrobial shield 704 includes a first portion 706, a second portion 708, and a seam 710 where first portion 706 is coupled to second portion 708. As shown in FIG. 8, second portion 708 includes a plurality of sidewalls 712 that form a cavity 714 configured to receive antimicrobial core 702 therein. In the embodiment, sidewalls 712 are substantially flush with a top surface 716 of core 702. Alternatively, sidewalls 712 terminate short of top surface 716 and second portion 708 of shield 704 includes sidewalls (not shown) that engage sidewalls 712 to form antimicrobial article 700.

In such a configuration, antimicrobial article 700 is formed by welding first portion 706 of shield 704 to second portion 708 under high pressure. For example, a pressure within a range of approximately 50 kpsi to approximately 90 kpsi is applied to at least one of portions 706 and 708. Such high pressure ensures that no air gaps are present between core 702 and shield 704. As described below, the high pressure imparted on portions 706 and 706 results in an ionic transfer of antimicrobial particles 720 from core 702 into shield 704.

Furthermore, in another embodiment, core 702 and shield 704 of antimicrobial article 700 is formed by additive manufacturing. As is known in the art, additive manufacturing includes forming pluralities of layers of material on top of one another to form a specific shape. Regarding core 702, layers of the core materials described above are stacked to from core 702. In one embodiment, the concentration of the active antimicrobial material in core varies within core 702. In another embodiment, the concentration of the active antimicrobial material is consistent throughout core 702. Regarding shield 704, layers of any of the shielding materials described above are formed to build shield 704. However, instead of forming shield 704 from only the non-antimicrobial materials described above, a predetermined number of antimicrobial particles 720 are included in shield 704 based on the location of the particles 720 with respect to core 702.

In both the welded and additive manufacture embodiments described above, the amount of antimicrobial particles 720 in shield 704 increases with the proximity to core 702. For example, the concentration of particles 720 changes in shield 704 from core top surface 716 to shield top surface 718. More specifically, particles have a first concentration 722 at a first distance D1 from top surface 716, a second concentration 724 at a second distance D2 from top surface 716, and a third concentration 726 at a third distance D3 from top surface 716. Such a configuration of including a varying amount of antimicrobial material in shield 704 aids in eliminating pathogens from exterior surfaces of antimicrobial article 700.

Figure 9:
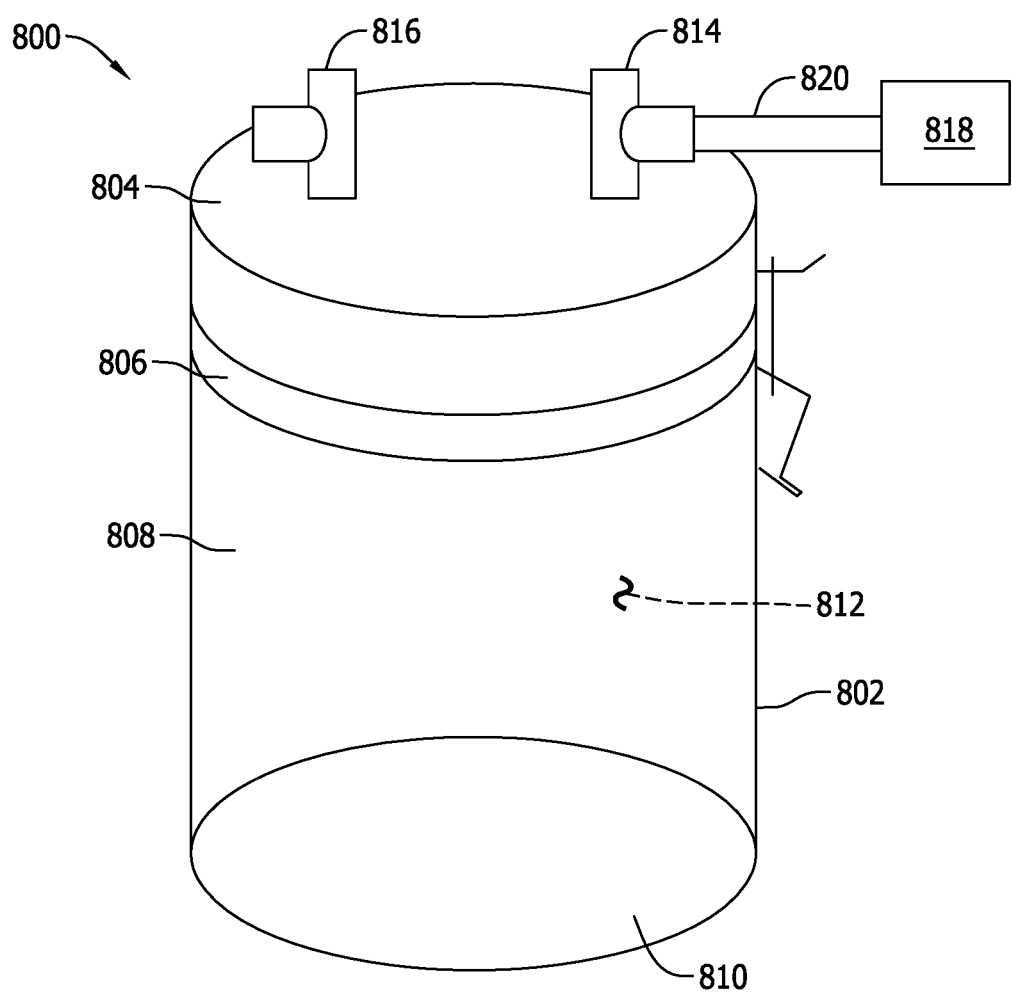
FIG. 9 is a perspective view of another food storage container including any of the antimicrobial articles shown in FIGS. 2, 5, and 6.

FIG. 9 is a perspective view of another storage container 800 including any of the antimicrobial articles 100, 500, and 600 shown in FIGS. 3, 6, and 7. In one embodiment, container 800 includes a body portion 802 and a lid 804 removably coupled to body portion 802. A seal 806 is coupled between body portion 802 and lid 804 to prevent ingress or egress of fluids or particles into container 800 when lid 804 is closed. Body portion 802 includes at least one sidewall 808 and a bottom wall 810 that, along with lid 804, define a cavity 812 within container 800 in which food is meant to be stored.

In the embodiment shown in FIG. 9, sidewalls 808 are formed from at least one of a plastic and a glass material such that sidewalls 808 are transparent or translucent. In such configurations, sidewalls 808 are formed from a material that at least partially blocks UVB rays from penetrating sidewalls 808 and impinging in any food items within cavity 812. Research has shown that UVB rays are able to sustain life in certain pathogens and so blocking these rays aid in neutralizing these pathogens and expanding the shelf life of the food item within container 800. In other embodiments, sidewalls 808 are formed from any material that facilitate operation of container 800 as described herein and may be transparent, translucent, or opaque.

Furthermore, in one embodiment, bottom wall 810 of body portion 802 is formed from any of antimicrobial articles 100, 500, and 600 shown in FIGS. 2, 5, and 6. Alternatively, bottom wall 810 is formed from the same material as sidewalls 808 and a plate of one of antimicrobial articles 100, 500, or 600 is positioned on bottom wall 810. As described herein, food meant for consumption, or any other item requiring sterile containment, is placed within container 800 having one of antimicrobial articles 100, 500, or 600. The "spectrum of efficacy" of antimicrobial articles 100, 500, or 600, as described above, effectively neutralizes a majority of the pathogens that cause the food items to begin to decay and other items to become non-sterile. As such, food items stored in container 800 decay at a much slower rate than when not exposed to the "spectrum of efficacy" of antimicrobial articles 100, 500, or 600, and food items with a relatively short shelf life, such as fruits, may be stored in container 300 in an edible state for a much longer period of time before consumption. With respect to other items, such as medical devices and instruments, the sterile environment within container 800 eliminates bacteria and pathogens that may be harmful to humans.

Additionally, lid 804 of container 800 includes an inlet valve 814 and an outlet valve 816 that each couple cavity 812 in flow communication with the environment outside container. As shown in FIG. 9, inlet valve 814 is coupled in flow communication with a source 818 of inert gas through a conduit 820. Inlet valve 814 is configured to channel a flow of inert gas from source 818 in order to purge oxygen from within container 800. More specifically, inlet valve 814 channels an inert gas such as, but not limited to nitrogen or carbon dioxide, into cavity 812 such that cavity 812 is purged of any oxygen. As the inert gas is channeled into cavity 812, outlet valve 816 is activated to enable oxygen to escape container 800. In the embodiment, outlet valve 816 is a one-way valve, such as but not limited to a check valve, which enables oxygen to flow out of cavity 812 without allowing air from outside container 800 back into cavity 812. As such, the inert gas from source 818 is the only fluid within cavity 812.

Many fungi and other harmful bacteria require oxygen to survive and replacing the oxygen from within cavity 812 with a non-breathable inert gas prevents growth of such organisms. Accordingly, the combination of UVB blocking sidewalls 808, antimicrobial articles 100, 500, and 600, and the inert gas valve system combine to neutralize many, if not all, known harmful fungi, bacteria, and pathogens that may cause food spoilage.

Figure 10:
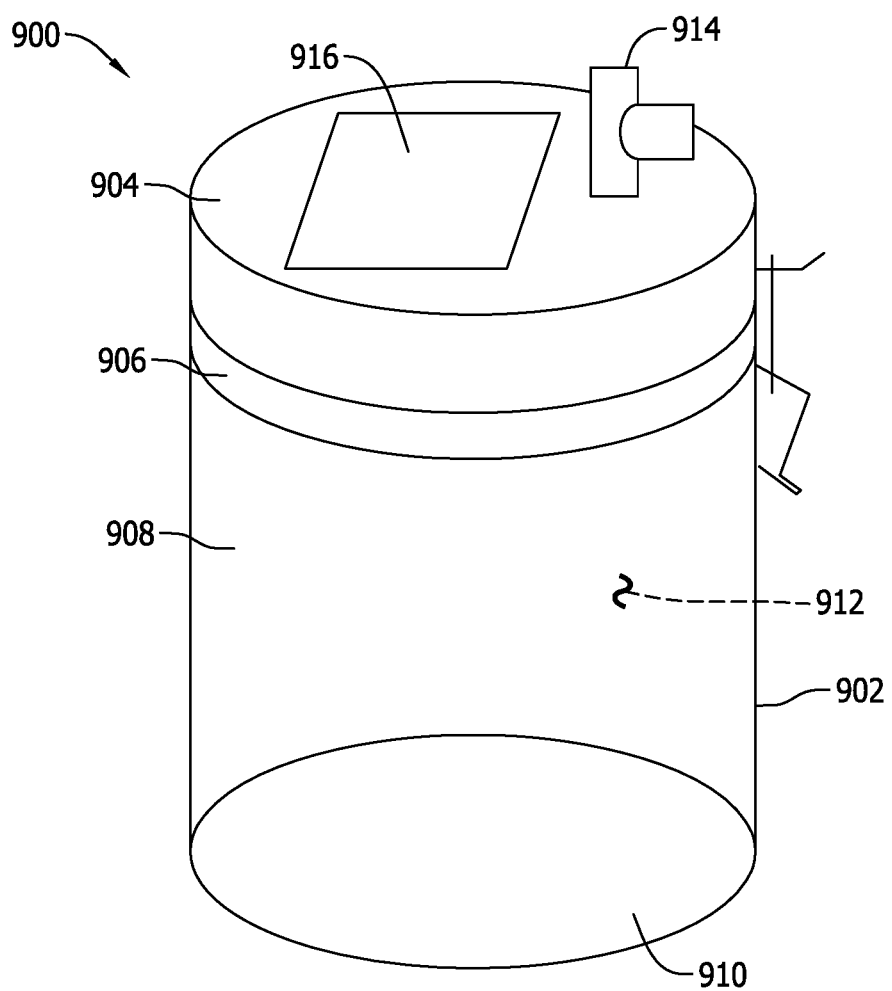
FIG. 10 is a perspective view of yet another food storage container including any of the antimicrobial articles shown in FIGS. 2, 5, and 6.
Figure 11:
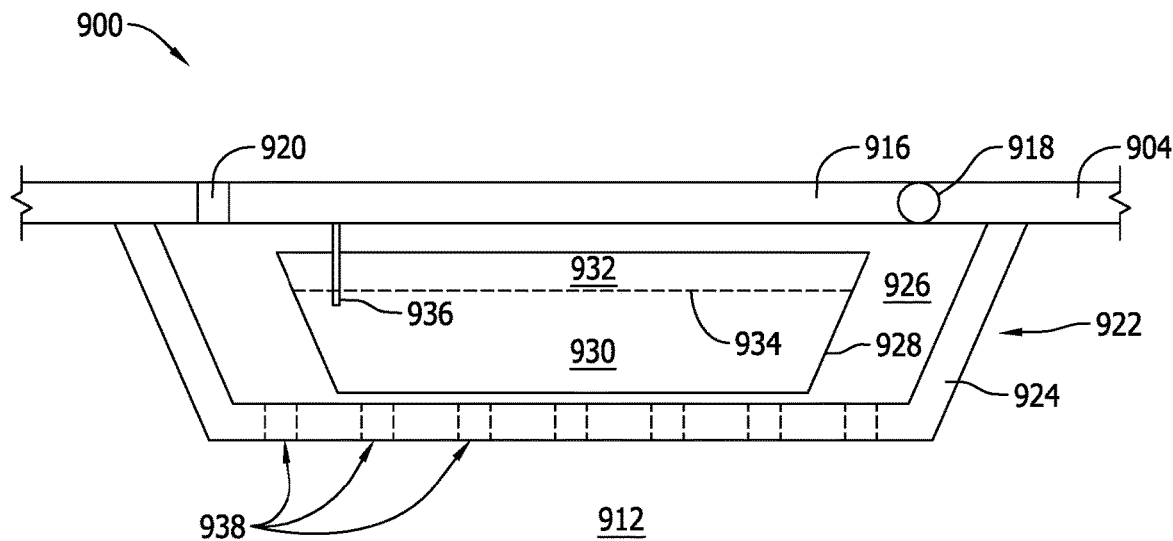
FIG. 11 is a cross-sectional view of a lid of the container shown in FIG. 10 illustrating an exemplary compartment.

FIG. 10 is a perspective view of yet another food storage container 900 including any of the antimicrobial articles 100, 500, and 600 shown in FIGS. 2, 5, and 6. FIG. 11 is a cross-sectional view of a lid of the container shown in FIG. 10 illustrating an exemplary compartment. In one embodiment, container 900 includes a body portion 902 and a lid 904 removably coupled to body portion 902. A seal 906 is coupled between body portion 902 and lid 904 to prevent ingress or egress of fluids or particles into container 900 when lid 904 is closed. Body portion 902 includes at least one sidewall 908 and a bottom wall 910 that, along with lid 904, define a cavity 912 within container 900 in which food is meant to be stored.

In the embodiment shown in FIG. 10, sidewalls 908 are formed from at least one of a plastic and a glass material such that sidewalls 908 are transparent or translucent. In such configurations, sidewalls 908 are formed from a material that at least partially blocks UVB rays from penetrating sidewalls 908 and impinging in any food items within cavity 912. Research has shown that UVB rays are able to sustain life in certain pathogens and so blocking these rays aid in neutralizing these pathogens and expanding the shelf life of the food item within container 900. In other embodiments, sidewalls 908 are formed from any material that facilitate operation of container 900 as described herein and may be transparent, translucent, or opaque.

Furthermore, in one embodiment, bottom wall 910 of body portion 902 is formed from any of antimicrobial articles 100, 500, and 600 shown in FIGS. 2, 5, and 6. Alternatively, bottom wall 910 is formed from the same material as sidewalls 908 and a plate of one of antimicrobial articles 100, 500, or 600 is positioned on bottom wall 910.

As described herein, food meant for consumption, or any other perishable item, is placed within container 900 having one of antimicrobial articles 100, 500, or 600. The "spectrum of efficacy" of antimicrobial articles 100, 500, or 600, as described above, effectively neutralizes a majority of the pathogens that cause the food items to begin to decay. As such, food items stored in container 900 decay at a much slower rate than when not exposed to the "spectrum of efficacy" of antimicrobial articles 100, 500, or 600, and food items with a relatively short shelf life, such as fruits, may be stored in container 300 in an edible state for a much longer period of time before consumption.

Additionally, lid 904 of container 800 includes an outlet valve 914 that enables oxygen to escape container 900. In the embodiment, outlet valve 914 is a one-way valve, such as but not limited to a check valve, which enables oxygen to flow out of cavity 912 without allowing air from outside container 900 back into cavity 912.

In the embodiment shown in FIGS. 10 and 11, lid 904 of container 900 also includes a flap or door 916 pivotally coupled to lid 904 at a hinge 918. Lid 904 also includes a seal 920 coupled between lid 904 and door 916 to prevent ingress or egress of fluids or particles into cavity 912 when door 916 is closed.

As shown in FIG. 11, lid 904 further includes a compartment 922 coupled to lid 904 such that compartment 922 extends into cavity 912. Compartment 922 includes a plurality of walls 924 that combine to form a cavity 926, which is accessible from outside container 900 when door 916 is open. Although shown and described as a portion of lid 904, it is contemplated that compartment 922 and door 916 may be formed in either of sidewall 908 or bottom wall 910 rather than lid 904.

Container 900 also includes a removable cartridge 928 positioned within compartment cavity 926. In the exemplary embodiment, removable cartridge 928 is a single use disposable device that introduces an inert gas into cavities 926 and 912 that displaces oxygen within cavities 926 and 912. In one embodiment, cartridge 928 includes a first portion 930 and a second portion 932 separated by a divider membrane 934. Portions 930 and 932 contain different materials that, when combined, generate an inert gas, such as carbon dioxide. More specifically, first portion includes a dry material such as, but not limited to, at least one of yeast, bismuth, transitional metal powder, and baking soda. Further, second portion includes a wet or liquid material such as, but not limited to citric acid, water, and vinegar.

In operation, cartridge 928 is positioned inside compartment 922 and door 916 is closed. As door 916 is closed, a projection 936 on door 916 extends into cartridge 928 and punctures divider wall 934 to enable liquid material from second portion 932 to mix with dry material in first portion 930. As described herein, when these material encounter each other, a chemical reaction occurs resulting in generation of an inert gas. The gas flows out of cartridge 928, through a plurality of openings 938 in compartment wall 924, and into cavity 912 of container 900. In the embodiment shown in FIG. 12, the heaver-than-air inert gas will sink to the bottom of cavity 912 and push the oxygenated air up toward lid 904. In an embodiment where compartment 922 and door 916 are positioned proximate bottom wall 910, the inert gas forces the oxygen toward lid 904. Outlet valve 916 is then activated to enable oxygen to escape container 900, as described above. As such, the inert gas generated from cartridge 928 is the only fluid within cavity 912.

Many fungi and other harmful bacteria require oxygen to survive and replacing the oxygen from within cavity 912 with a non-breathable inert gas prevents growth of such organisms. Accordingly, the combination of UVB blocking sidewalls 908, antimicrobial articles 100, 500, and 600, and the inert gas generating cartridge combine to neutralize many, if not all, known harmful fungi, bacteria, and pathogens that may cause food spoilage.

Figure 12:
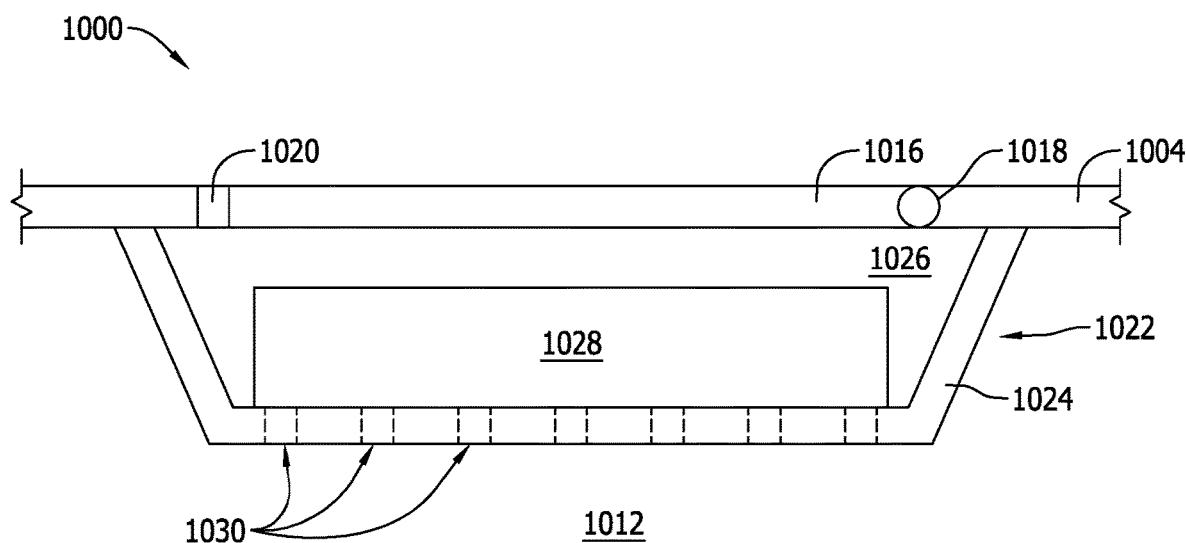
FIG. 12 is a cross-sectional view of the lid of the container shown in FIG. 10 illustrating another compartment.

FIG. 12 is a cross-sectional view of a portion of another container 1000 illustrating a lid 1004. In the embodiment shown in FIG. 12, lid 1004 of container 1000 also includes a flap or door 1016 pivotally coupled to lid 1004 at a hinge 1018. Lid 1004 also includes a seal 1020 coupled between lid 1004 and door 1016 to prevent ingress or egress of fluids or particles into cavity 1012 when door 1016 is closed.

As shown in FIG. 12, lid 1004 further includes a compartment 1022 coupled to lid 1004 such that compartment 1022 extends into cavity 1012. Compartment 1022 includes a plurality of walls 1024 that combine to form a cavity 1026, which is accessible from outside container 1000 when door 1016 is open. Although shown and described as a portion of lid 1004, it is contemplated that compartment and door 1016 may be formed in a sidewall of container 1000 rather than lid 1004.

Container 1000 also includes an oxygen elimination component 1028 positioned within cavity 1026. In one embodiment, component 1028 is a mass of dry ice that is insertable into cavity 1026 through door 1016. As the dry ice sublimates, it produces gaseous carbon dioxide that flows through a plurality of openings 1030 in wall 1024 to displace the oxygen from within cavity. Similar to container 900 described above, container 1000 includes a one-way valve that enables oxygen to escape without allowing other gases or particles into container 1000.

In another embodiment, component 1028 is a commercially available oxygen absorption packet that continuously absorbs oxygen for an extended period of time until the material within packet 1028 is saturated. As such, the amount and duration of oxygen absorption is based on the size of container 1000. Furthermore, packet 1028 is not restricted to placement within compartment 1022. More specifically, packet 1028 may be positioned on either of bottom walls 810 and 910 and used in combination with the inert gas purge system of container 800 or the cartridge system of container 900 to further remove oxygen from within cavities 812 and 912.

Experimental Data

A prototype of the antimicrobial article described above utilizing an antimicrobial alloy core of at least 70% copper core, and cladded with stainless 316L alloy was tested by an independent testing laboratory using the pathogen *Staphylococcus aureus* ATCC 6538, which may also be known as "MRSA". The results showed the pathogen strain was reduced by 99% in approx. 100 minutes on the prototype antimicrobial article. The pathogen did not have direct contact with the copper alloy core, and yet was neutralized by the "spectrum of efficacy". This is in contrast to the common convention in the industry that the "spectrum of efficacy" is effectively blocked by any shielding material placed between the antimicrobial alloy and the pathogen to protect the alloy.

In the experiment, three metal plate samples: 1) titanium, 2) stainless steel clad copper and nickel antimicrobial alloy, and 3) exposed copper and nickel antimicrobial alloy were exposed to *Staphylococcus aureus* ATCC 6538 for a time period of 24 hours and measurements of the number of pathogen cells remaining were conducted at regular time periods. Table 1 below illustrates the results:

TABLE 1

| Time (hrs) | Sample 1 | Sample 2 | Sample 3 |
| --- | --- | --- | --- |
| T = 0 | >1,200 | >1,200 | >1,200 |
| T = 1 | >1,200 | >1,200 | <0.25 |
| T = 2 | >1,200 | 370 | <0.25 |
| T = 3 | 920 | 9.9 | <0.25 |
| T = 24 | <0.25 | <0.25 | <0.25 |

As shown in Table 1, at relatively low population densities (<4,000 cells), Sample 3, the exposed copper and nickel antimicrobial alloy, showed significant population reduction of *Staphylococcus aureus* strain ATCC 6538. Specifically, Sample 3 showed a greater than 4000-fold reduction in the population at one hour. At two hours, Sample 2, the stainless steel clad copper and nickel antimicrobial alloy, also showed significant anti-pathogen activity reducing the number of *Staphylococcus aureus* strain ATCC 6538 cells by more than three-fold. At three hours, the 10 μL droplets of pathogen-containing fluid were visibly evaporating and the titanium metal (Sample 1) was also showing a decrease in pathogen cells most likely due to dehydration. No evidence of MRSA was obtained at 24 hours from the beginning of the experiment. Although contained in covered dishes, no additional humidification of the chambers was performed. These tests were conducted at a constant 27° C. (80.6° F.).

In one embodiment, an article includes a first layer of a shielding material comprising a first surface and an opposite second surface, wherein the second surface comprises at least one depression. The article also includes a core material coupled to the first surface. The core material includes an antimicrobial property configured to eliminate pathogens located on the second surface, and the at least one depression is configured to focus the antimicrobial property at a predetermined location.

The at least one depression includes a single depression such that the second surface is parabolic between a first end and an opposing second end of the second surface.

Alternatively, the at least one depression includes a plurality of depressions positioned between a first end and an opposing second end of the second surface.

The at least one depression is configured to focus the antimicrobial property at a predetermined location above the second surface.

In another embodiment, an article includes a shielding material comprising a first surface exposed to an exterior environment, an opposing second surface, and a thickness defined therebetween. The article also includes a core material coupled to the first surface and including an antimicrobial property configured to eliminate pathogens located on the first surface. The shielding material comprises a concentration of particles of the core material between the first and second surfaces.

The concentration of the core material particles is based on a distance from the core material.

The shielding material comprises a first concentration at a first distance from the core material and a second concentration at a second distance from the core material, wherein the first distance is shorter than the second distance, and the first concentration is higher than the second concentration.

The core material and the shielding material are in a face-to-face relationship such that no air gaps are defined between the shielding material and the core material.

In yet another embodiment, a storage container includes a plurality of walls defining a cavity configured to receive an item for disinfection therein and a lid coupled to the plurality of walls and configured to seal the cavity. The storage container also includes an outlet valve coupled to the lid and configured to enable passage of a fluid from within the cavity to an exterior environment. The storage container further includes an antimicrobial article comprising a first layer of a non-antimicrobial shielding material comprising a first surface and an opposite second surface, and an antimicrobial core material coupled to the first surface. The antimicrobial core material is configured to eliminate pathogens located on the second surface and within the cavity.

The storage container further includes an inlet valve coupled to the lid and configured to channel a flow of an inert gas into the cavity.

The storage container also includes a door formed in one of the lid and one of the plurality of walls and also a compartment coupled to the lid or one of the walls. The compartment comprises a wall defining an interior and a plurality of openings defined in the wall such that the compartment interior and the container cavity are in flow communication with each other.

In such a configuration, the storage container includes a deoxygenation mechanism positioned within the compartment and configured to remove oxygen from the cavity.

In one embodiment, the deoxygenation mechanism comprises an oxygen absorption packet configured to absorb any oxygen within the cavity.

Alternatively, the deoxygenation mechanism comprises a cartridge configured to generate an inert gas to displace any oxygen within the cavity.

The cartridge includes a first portion, a second portion, and a divider positioned therebetween, and the door includes a projection configured to puncture the divider to enable mixing of a first substance within the first portion and a second substance within the second portion to generate the inert gas.

The above described antimicrobial article facilitates efficient methods of disinfecting a surface. Specifically, in contrast to many known antimicrobial articles, the antimicrobial article described herein includes an antimicrobial core coupled to a non-antimicrobial shield configured to protect the core from exposure to external elements. The antimicrobial core includes an antimicrobial property due to a "spectrum of efficacy" from an antimicrobial effect produced by the protected antimicrobial core that disinfects, within a relatively short period of time, a surface of the non-antimicrobial shield opposite the antimicrobial core without the core directly contacting the pathogens located on the shield surface. The antimicrobial core includes an alloy of at least 50% of any combination of antimicrobial copper/copper alloys, gold, silver, and molybdenum, with the remaining portion of the core including a non-antimicrobial alloy, such as nickel or zinc. The non-antimicrobial shield is fabricated from a non-antimicrobial material, such as, but not limited to stainless steel and serves as a protective layer to the antimicrobial core providing strength, physical and chemical durability, and stainless qualities.

By effectively eliminating harmful pathogens from a surface of a protective material coupled to the antimicrobial core without directly contacting the pathogens, the above described antimicrobial article exploits the benefits of the "spectrum of efficacy" provided by the antimicrobial core alloy, and yet still provides durability and chemical resistance qualities of stainless steel to shield the antimicrobial core.

Exemplary embodiments of methods, systems, and apparatus for using an antimicrobial article are not limited to the specific embodiments described herein, but rather, components of articles and steps of the methods may be utilized independently and separately from other components and steps described herein. For example, the antimicrobial article may be used in combination with other application environments and in other procedures, and is not limited to practice with the systems or methods described herein. Rather, the exemplary antimicrobial article can be implemented and utilized in connection with many other applications, equipment, and systems that may benefit from the advantages described herein.

Although specific features of various embodiments of the disclosure may be shown in some drawings and not in others, this is for convenience only. In accordance with the principles of the disclosure, any feature of a drawing may be referenced and claimed in combination with any feature of any other drawing.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An article comprising:
a first layer of a non-antimicrobial shielding material comprising a first surface and an opposite second surface;
a core material coupled to said first surface, said core material configured to eliminate pathogens located on said second surface wherein said core material comprises an antimicrobial material configured to eliminate the pathogens on said second surface without contacting the pathogens, wherein said core material comprises a copper alloy; and
a second layer of said non-antimicrobial shielding material coupled to said antimicrobial core material opposite said first layer, wherein said non-antimicrobial shielding material encases said core material such that said core material is not exposed to the ambient surroundings, wherein said non-antimicrobial shielding material comprises stainless steel, and wherein said first layer, said core material, and said second layer are the only three layers of said article; and wherein at least a portion of said second surface of said first layer of said non-antimicrobial shielding material is curvilinear in shape to focus the antimicrobial effect of said core material.

2. The article in accordance with claim 1, wherein said core material comprises an antimicrobial alloy comprising an antimicrobial active component and a non-antimicrobial inactive component.

3. The article in accordance with claim 2, wherein said antimicrobial active component comprises a copper alloy.

4. The article in accordance with claim 3, wherein said non-antimicrobial inactive component comprises nickel.

5. The article in accordance with claim 4, wherein said antimicrobial alloy comprises approximately 70% said antimicrobial active component and approximately 30% said non-antimicrobial inactive component.

6. The article in accordance with claim 4, wherein said antimicrobial active component comprises at least 2% of said core material.

7. The article in accordance with claim 4, wherein said non-antimicrobial inactive component comprises between approximately 1% and approximately 98% of said core material.

8. The article in accordance with claim 1, wherein said non-antimicrobial shielding material comprises between approximately 10% to approximately 99% by volume of a total material of said article.

9. The article in accordance with claim 8, wherein said core material comprises between approximately 1% to approximately 90% by volume of a total material of said article.

10. An article comprising:
a first layer of a shielding material comprising a first surface and an opposite second surface; and
a core material coupled to said first surface, said core material configured to eliminate pathogens located on said second surface wherein said core material comprises an antimicrobial material configured to eliminate the pathogens on said second surface without contacting the pathogens, wherein said shielding material encases said core material such that said core material is not exposed to the ambient surroundings, wherein said core material comprises an antimicrobial alloy comprising at most 90% copper and at least 10% nickel; and wherein at least a portion of said second surface of said first layer of said shielding material is curvilinear in shape to focus the antimicrobial effect of said core material.

11. The article in accordance with claim 10, wherein said shielding material comprises a non-antimicrobial material.

12. The article in accordance with claim 11, wherein said shielding material comprises a non-antimicrobial material comprising at least one of stainless steel, nickel, aluminum, a plastic material, an elastomeric material, and a ceramic material.

13. The article in accordance with claim 10, wherein the shielding material comprises stainless steel.

14. An article comprising:
a first layer of a shielding material comprising a first surface and an opposite second surface; and
a core material coupled to said first surface, said core material configured to eliminate pathogens located on said second surface wherein said core material comprises an antimicrobial material configured to eliminate the pathogens on said second surface without contacting the pathogens, wherein said shielding material encases said core material such that said core material is not exposed to the ambient surroundings wherein said core material comprises an antimicrobial alloy comprising approximately 70% copper and approximately 30% nickel; and wherein at least a portion of said second surface of said first layer of said shielding material is curvilinear in shape to focus the antimicrobial effect of said core material.

15. The article in accordance with claim 14, wherein said shielding material comprises a non-antimicrobial material comprising at least one of stainless steel, nickel, aluminum, a plastic material, an elastomeric material, and a ceramic material.

16. The article in accordance with claim 14, wherein the shielding material comprises stainless steel-steel.

17. The article in accordance with claim 14, wherein said shielding material includes a plurality of active antimicrobial particles.

18. The article in accordance with claim 17, wherein said plurality of active antimicrobial particles are evenly distributed within said shielding material.

19. The article in accordance with claim 17, wherein a concentration of said active antimicrobial particles in said shielding material increases with proximity to said core material.

* * * * *